US011878194B2

(12) United States Patent
O'Donnell et al.

(10) Patent No.: US 11,878,194 B2
(45) **Date of Patent: *Jan. 23, 2024**

(54) FIRE SPIKES, FIRE SPIKE TIPS, AND METHODS OF SUPPRESSING FIRE

(71) Applicant: FLASHPOINT FIRE EQUIPMENT, INC., Sherwood Park (CA)

(72) Inventors: Ryan O'Donnell, Troy, NY (US); Michael Todd Nixon, Sherwood Park (CA)

(73) Assignee: Flashpoint Fire Equipment, Inc., Sherwood Park (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/820,907

(22) Filed: Aug. 19, 2022

(65) Prior Publication Data

US 2022/0395713 A1 Dec. 15, 2022

Related U.S. Application Data

(63) Continuation of application No. 16/377,170, filed on Apr. 6, 2019, now Pat. No. 11,471,718.

(Continued)

(51) Int. Cl.

| | |
|---|---|
| ***A62C 31/22*** | (2006.01) |
| ***A62C 3/00*** | (2006.01) |
| ***A62C 31/00*** | (2006.01) |

(52) U.S. Cl.

CPC ................ *A62C 31/22* (2013.01); *A62C 3/00* (2013.01); *A62C 31/005* (2013.01)

(58) Field of Classification Search

CPC .......... A62C 31/22; A62C 31/005; A62C 3/00

See application file for complete search history.

(56) References Cited

U.S. PATENT DOCUMENTS 2,548,621 A 4/1951 Rutledge
2,993,650 A * 7/1961 Badberg .................... B05B 1/14 239/443

(Continued)

FOREIGN PATENT DOCUMENTS

DE 10152757 A1 11/2003
WO 2013180627 A1 12/2013

OTHER PUBLICATIONS

Fognail® LP Attack & Restrictor, DAFO Worldwide, web page accessed Apr. 3, 2018, 2 pages.

(Continued)

*Primary Examiner* — Steven M Cernoch

(74) *Attorney, Agent, or Firm* — Tech Valley Patent, LLC; John Pietrangelo

(57) ABSTRACT

Fire spikes and fire spike tips adapted to penetrate a surface and distribute a fire suppressant, such as, water, on the opposite side of the surface are provided. The fire spike tips include a cylindrical body having a first end adapted to be received by a conduit and a second end having a pointed projection adapted to penetrate the surface; an internal cavity in the cylindrical body having an open first end and a closed second end; a plurality of first orifices in the body, each of the plurality of first orifices directed in a first substantially radial direction; and a plurality of second orifices in the body, each of the plurality of second orifices directed in a second direction which at least partially intersects with the first direction of the plurality of first orifices. Kits for the fire spikes and methods of suppressing fire are also provided.

19 Claims, 10 Drawing Sheets

Related U.S. Application Data

(60) Provisional application No. 62/654,509, filed on Apr. 8, 2018.

(56) References Cited

U.S. PATENT DOCUMENTS

| | | | |
|---|---|---|---|
| 5,062,486 | A | 11/1991 | McClenahan |
| 5,253,716 | A | 10/1993 | Mitchell |
| 6,668,939 | B2 | 12/2003 | Schmidt et al. |
| 7,017,832 | B1 | 3/2006 | Nelson et al. |
| 8,807,233 | B2 | 8/2014 | Peltola et al. |

OTHER PUBLICATIONS

Fire & Risk Alliance, LLC Report dated Mar. 24, 2018, 114 pages.
Office Action for parent U.S. Appl. No. 16/377,170 dated Aug. 18, 2020.
Office Action for parent U.S. Appl. No. 16/377,170 dated Dec. 3, 2020.
Office Action for parent U.S. Appl. No. 16/377,170 dated May 21, 2021.
Office Action for parent U.S. Appl. No. 16/377,170 dated Jul. 2, 2021.
Office Action for parent U.S. Appl. No. 16/377,170 dated Dec. 15, 2021.
Interview Summary for parent U.S. Appl. No. 16/377,170 dated Feb. 8, 2022.

* cited by examiner

Modern Fire Time/Temperature Curve

FIRE SPIKES, FIRE SPIKE TIPS, AND METHODS OF SUPPRESSING FIRE

CROSS-REFERENCE TO RELATED APPLICATIONS

This application is a continuation application of U.S. application Ser. No. 16/377,170, filed on Apr. 6, 2019, now U.S. Patent XYZ, which claims priority from U.S. Provisional Patent Application 62/654,509, filed on Apr. 8, 2018, the disclosures of which are included by reference herein in their entirety.

BACKGROUND OF THE INVENTION

Technical Field

The present invention generally relates to fire suppression or fire fighting equipment. More particularly, the present invention relates to fire spike assembles and fire spike tips adapted to penetrate a barrier and distribute fire suppressing fluids, for example, water, beyond the barrier.

Description of Related Art

Challenges to the modern firefighter continue to escalate even with improvements in firefighting equipment and firefighting techniques. The fuels present in modern structures that accelerate fires (for example, building contents such as furniture, décor, and finishes) have significantly higher "heat release rates" during combustion than "legacy fuels," that is, fuels typically present just 30 years ago—in the 1980s. In addition, building construction has shifted to favor larger buildings, lightweight construction, and engineered lumber, which often fail faster under fire load than legacy construction materials. Furthermore, modern energy codes require modern buildings to be sealed tighter, restricting airflow in and out of a structure.

These and other factors have been found to result in fires that burn with more power (that is, higher heat release rates), for example, reaching "flashover" more quickly. As known in the art, the term "flashover" refers to the dangerous condition in which most of the directly exposed combustible material in an enclosed area substantially simultaneously ignites, for example, due to the ignition of flammable gases generated prior to flashover. These factors can reduce victim tenability and increase risks to firefighters entering structures to search for victims and control the fire. Because modern fuels have higher heat release rates, they require more oxygen for combustion, and with buildings sealed more effectively, fires can quickly become limited by oxygen.

One phenomenon that has been determined to place firefighters at risk is ventilation-induced flashover, the point represented by the second upright line in FIG. 1. This condition occurs when a fire has become ventilation limited prior to arrival of fire personnel. Unlike the earlier portion of the curve in FIG. 1 representing standard fire growth at a more gradual pace, the spike in heat-release-rate (HRR) associated with the return of ventilation is very rapid and extremely dangerous to civilians and fire personnel exposed to the event. Once firefighters create openings (for example, by opening doors to the structure to access the fire compartment while advancing hoselines to the fire), air is introduced to the fire and, because heat and fuel are typically present in large quantities, the fire conditions deteriorate rapidly, and can produce a "flashover."

Applying water or other fluid fire suppressant to a fire-containing compartment without introducing air, that is, without introducing oxygen:

a) can prevent ventilation induced flashover;

b) can reduce the total water required to control the fire by maintaining the lowest possible heat-release-rate (An advantage in situations where limited water is available due to the absence of hydrant systems and/or damaged or plugged standpipe systems);

c) can reduce thermal damage to the building by quickly controlling the fire;

d) can reduce smoke damage to areas outside of the fire-containing compartment by reducing temperature in the fire-containing compartment which, in turn, can reduce the pressure differential between the fire-containing compartment and adjacent hallways or rooms;

e) can support "sheltering in place" for occupants in adjacent areas on the fire floor in large center-hallway apartment and hotel facilities (This is particularly important in larger occupancies or when staffing levels are limited); and f) can reduce direct risks to firefighters by lowering temperatures and reducing the time to fire control, and can reduce the threat of dermal exposure to occupants and firefighters by cooling the by-products of combustion and reducing the risk of exposure to cancer-causing nanoparticles.

Accordingly, a need exists in the art to effectively apply water or other fluid fire suppressant to a fire-containing compartment with little or no introduction of air, that is, without introducing oxygen, for at least the above benefits.

Aspects of the present invention provide devices, assemblies, and methods that can more effectively introduce water or other fluid fire suppressants to fire-containing compartments while minimizing or preventing the introduction of oxygen to the fire-containing compartments.

SUMMARY OF THE INVENTION

The present invention includes embodiments drawn to fire spike assemblies, fire spike tips, methods of suppressing fire, and kits for carrying and/or storing fire spike assemblies and fire spike tips, for example, such as those disclosed herein, to more effectively introduce water or other fluid (that is, liquid and/or gas) fire suppressants to a fire-containing compartment.

One embodiment of the invention is a fire spike tip comprising or including: a cylindrical body having a first end adapted to be received by a conduit and a second end having a pointed projection adapted to penetrate a surface when the body is under a load; an internal cavity in the cylindrical body having an open first end and a closed second end; a plurality of first orifices in the body in fluid communication with the internal cavity, each of the plurality of first orifices directed in a first substantially radial direction; and a plurality of second orifices in the body in fluid communication with the internal cavity, each of the plurality of second orifices directed in a second direction which at least partially intersects with at least one first direction of one of the plurality of first orifices. In one aspect, the first substantially radial direction comprises a direction perpendicular to an axis of the cylindrical body. In another aspect, the at least partially intersects comprises an offset, δ, of centerlines of the first direction and the second direction, for example, where the offset, δ, may range from 0.025 inches to about 0.100 inches.

In another aspect, the offset, δ, comprises a percentage of a dimension of one of the first plurality of orifices and the second plurality of orifices.

In one aspect, the intersection of a second fluid flow out of the plurality of second orifices with a first fluid flow out of the plurality of first orifices results in a lower droplet size than without the intersection.

In another aspect, the intersection of a second fluid flow out of the second plurality of orifices with a first fluid flow out of the plurality of first orifices results in a lower distribution parameter, N.

In another aspect, the plurality of second orifices is oriented in a direction making an angle α with a centerline of the cylindrical body, for example, the angle α may range from 30 degrees to 60 degrees.

Another embodiment of the invention is a fire spike assembly comprising or including: an elongated conduit having a first end and a second end; and one of the above fire spike tips mounted to the second end. In one aspect, the assembly may further include a striking head mounted to the first end of the elongated conduit. In another aspect, the assembly may further include a valve stem mounted to the striking head, the valve stem having an internal passage in fluid communication with an internal passage of the elongated conduit. In one aspect, the striking head may be a polygonal cylindrical shape, for example, a square cylindrical shape or a rectangular cylindrical shape.

A further aspect of the invention is a method of distributing a fire-suppressing mist of fluid, the method comprising or including: directing a first plurality of flows of the fluid in a first direction in the vicinity of a fire; directing a second plurality of flows of the fluid in a second direction in the vicinity of a fire, wherein the second direction of each of the plurality of flows at least partially intersects with at least one first direction of one of the first plurality of flows; and impacting at least some of the first plurality of flows with at least some second plurality of flows to thereby generate the fire-suppressing mist of fluid. In one aspect, directing the first plurality of flows is practiced by dispensing the first plurality of flows from a cylindrical body, and wherein the first direction is a radial direction substantially perpendicular to a longitudinal axis of the cylindrical body. The fluid may a liquid, such as, water, or a gas.

In one aspect, the directing of the second plurality of flows of the fluid in a second direction is practiced by dispensing the second plurality of flows from a cylindrical body, and wherein the second direction is a direction making an angle α with a centerline of the cylindrical body, for example, the angle α may range from 30 degrees to 60 degrees.

A further embodiment of the invention is a kit for a fire spike, the kit comprising, or including: a carrying case; and one of the fire spike assemblies described above. In one aspect, the kit may further include at least one fire hose. In another aspect, the kit may further include at least one hose coupling to attach the least one fire hose to the fire spike. In another aspect, the kit may further include a hammer, for example, a hammer adapted for use in driving the fire spike through a surface.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Figure 1:
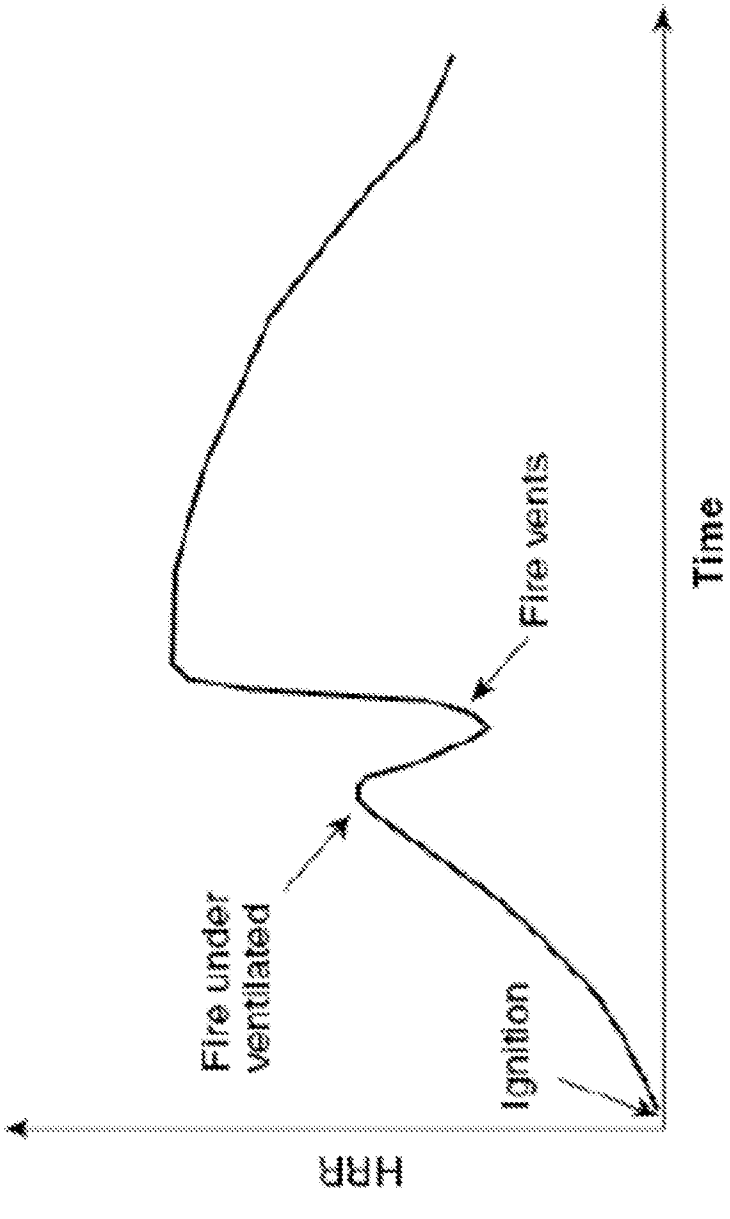
FIG. 1 is a time/temperature curve representing standard fire growth as heat-release-rate (HRR) as a function of time.
Figure 2:
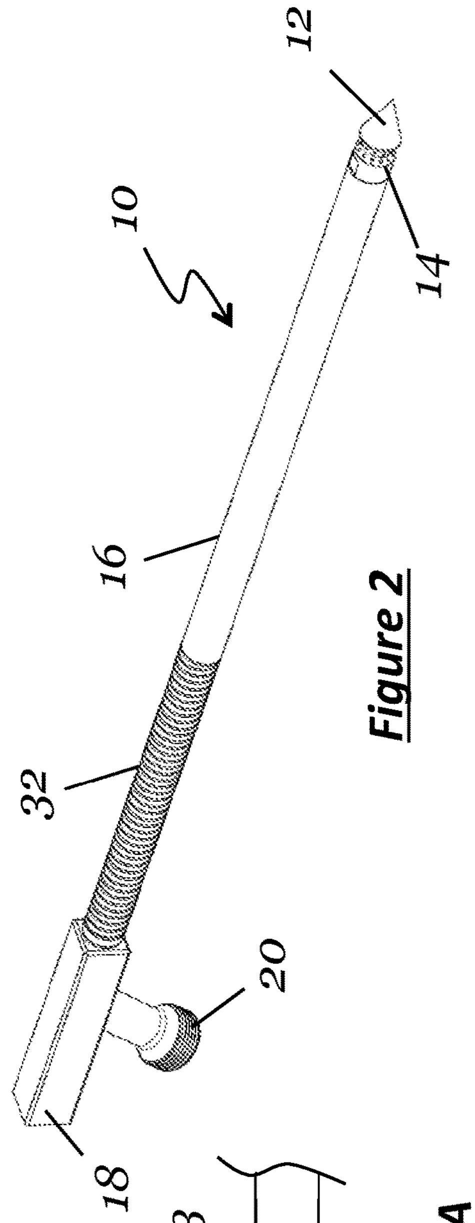
FIG. 2 is a perspective view of a fire spike assembly according to one aspect of the invention.

FIG. 2 is a perspective view of a fire spike assembly 10 according to one aspect of the invention. As shown, fire spike assembly 10 may typically include a fire spike tip or "nozzle" 12 having a plurality of orifices 14, a hollow elongated shaft, conduit, or tube 16, a bar or striking head 18, and a valve stem 20 adapted to receive a source of fluid, typically, water. In one aspect of the invention, fire spike tip 12 comprises a unique configuration of orifices 14 that enhances the effectiveness of the fire suppression capability of fire spike assembly 10 compared to the prior art. As is typical of the use of a fire spike as known in the art, when spike tip 12 is positioned against a surface to be penetrated, for example, a door of a home, striking the striking head 18 with an appropriate hammer causes the spike tip 12 and at least a portion of tube 16 to penetrate the surface, for example, a door or a wall. With the introduction of a pressurized fluid, typically water, to valve stem 20 and through hollow tube 16, the fluid can be discharged from orifices 14 into the space behind or beyond the surface to suppress any fire that may be present.

Figure 3:
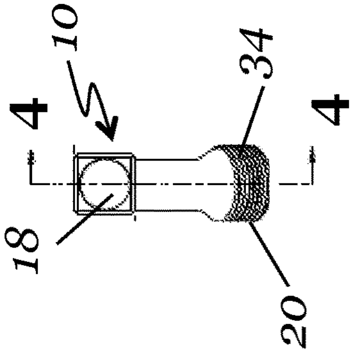
FIG. 3 is a left end view of the fire spike assembly shown in FIG. 2.
Figure 4:
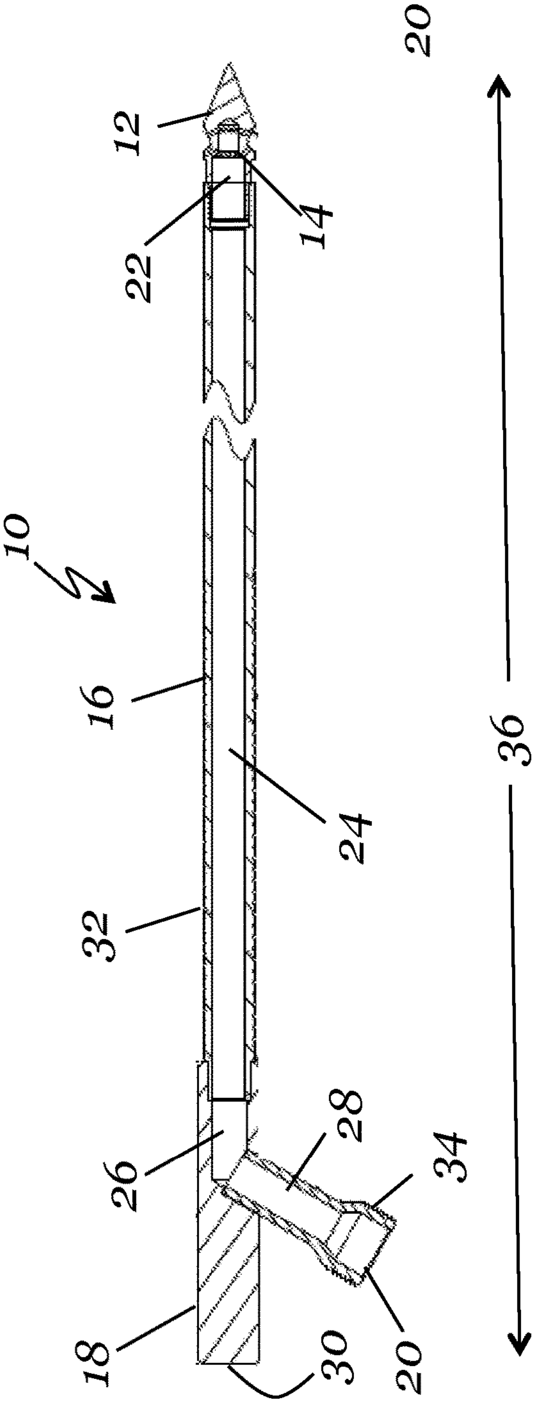
FIG. 4 is a cross-sectional view of the fire spike assembly shown in FIG. 2 as sectioned through section view 4-4 shown in FIG. 3.

FIG. 3 is a left-end view of the fire spike assembly 10 shown in FIG. 2, and FIG. 4 is a cross-sectional view of the fire spike assembly 10 shown in FIG. 2 as sectioned through section view 4-4 shown in FIG. 3.

As shown in FIG. 4, spike tip or nozzle 12 may typically be hollow or contain an internal cavity 22 that is open to, or in fluid communication with, an internal passage 24 of tube 16. Also, internal cavity 24 is open to, or in fluid communication with, an internal cavity 26 of striking head 18, which is open to an internal cavity 28 of valve stem 20. Accordingly, fluid introduced to internal cavity 28 of valve stem 20, for example, pressurized mains or hydrant water or its equivalent, can pass from internal passage 28 of valve stem 20 to internal cavity 26 of striking head 18, to the internal passage 24 of tube 16, to the internal cavity 22 of spike tip 12, and out of orifices 14.

As also shown in FIGS. 2 through 4, striking head 18 may typically comprise a cylindrical bar, for example, a metallic cylindrical bar, adapted to withstand and transmit a striking force/impact of a hammer, for example, upon end surface 30 of striking head 18. In one aspect, striking head 18 may comprise any cylindrical shape, for example, circular cylindrical, oval cylindrical, or triangular cylindrical, having a circular, oval, or triangular cross section, respectively. However, in one aspect, as shown in FIGS. 2 through 4, striking head 18 may be polygonal cylindrical in shape (or polygonal in cross section), for example, square cylindrical, rectangular, or hexagon cylindrical in shape, having a square, rectangular, or hexagonal cross section, respectively. In one aspect, the polygonal cylindrical shape of striking head 18 may be more conducive for engagement with with other tools, for example, with open end or adjustable wrenches, to facilitate removal of fire spike assembly 10 from being imbedded into a surface, for example, after use.

Figure 2A:
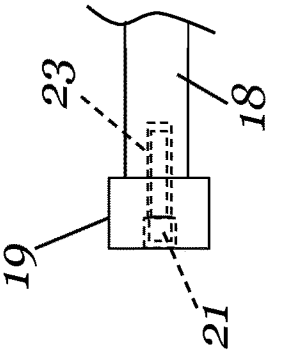
FIG. 2A is a side elevation view of a portion of the fire spike assembly shown in FIG. 2 according to one aspect of the invention.

FIG. 2A is a side elevation view of a portion of the fire spike assembly 10 shown in FIG. 2 according to one aspect of the invention having a striking head extension 19 for striking head 18, for example, a replaceable striking head extension 19. In this aspect, striking head extension 19 may comprise a relatively hard material, for example, a tool steel, that can be mounted to striking head 18 and more readily bear the repeated loading of hammer strikes with limited or no damage compared to the material of striking head 18. Striking head extension 19 may be mounted to striking head 18 by one or more mechanical fasteners 21, for example, by a threaded fastener 21, for instance, a socket head cap screw, threaded into one or more threaded holes 23 in the end of striking head 18. Striking head extension 19 may typically be cylindrical in shape, for example, circular cylindrical or polygonal cylindrical, such as, square cylindrical. As shown in FIG. 2A, striking head extension 19 may be larger in width or diameter than striking head 18, for instance, to provide a larger target to and enhance the likelihood of contact with the striking implement, such as, a hammer. In one aspect, striking head extension 19 may comprise a material, for example, a steel, having a hardness, for example, a Rockwell C hardness (RCH), greater than the hardness of the material of striking head 18. For example, when striking head 19 is fabricated from 304 stainless steel having a Rockwell B hardness (RBH) maximum of about 90-92 RBH (equivalent to about a Rockwell C hardness of about 10 RCH), striking head extension 19 may typically be fabricated from a material, such as, a tool steel, having a Rockwell C hardness of at least 30 RCH, but typically at least 50 RCH, and possibly at least 60 RCH.

In one aspect of the invention, tube 16 may also comprise any elongated cylindrical shape, for example, circular cylindrical, oval cylindrical, triangular cylindrical, or polygonal cylindrical in shape, for example, to facilitate engagement with other tools. However, as shown in FIGS. 2 and 4, tube 16 may typically comprise an elongated circular cylindrical shape, for example, to facilitate penetration into and withdrawal from a surface. In one aspect, at least a portion of the external surface of tube 16 may include a thread 32, for example, a UNC or an Acme thread, to facilitate removal of fire spike assembly 10 from penetration within a surface, such as, a wall. For example, in one aspect, thread 32 may comprise a right-hand thread that can facilitate removal of fire spike assembly 10 by the engagement of striking head 18 with a wrench, and rotating spike assembly 10 about threads 32 to assist in removing spike assembly 10 from a surface.

As also shown in FIG. 4, valve stem 20 may a circular cylindrical shape having a first end mounted to striking head 18, for example, by welding, brazing, an adhesive, and/or threads, and a second end adapted to engage a source of fluid, for example, a fire hose. As shown in FIGS. 2 through 4, the second end of valve stem 20 may typically comprise a thread 34 adapted to engage a hose or a hose coupling. For example, in one aspect, thread 34 of valve stem 20 may comprise an NPSH thread or a "fire hose thread," or its equivalent, for instance, a 1-inch NPSH thread.

As shown in FIGS. 2 through 4, in one aspect, valve stem 20 may engage striking head 18, for example, at an appropriate angle or orientation to facilitate handling of fire spike assembly 10. However, in another aspect, valve stem 20 may engage tube 16, for example, at any appropriate angle or orientation to facilitate handling.

As shown most clearly in FIG. 4, in one aspect, tube 16 may be mounted to striking head 18 by welding. In other aspects, tube 16 may be engage to striking head 18 by a threaded connection, for example, an external thread on tube 16 engaging an internal thread in striking head 18.

According to aspects of the invention, spike tip 12 may engage tube 16 by any conventional means, for example, by welding, brazing, and/or with an adhesive. However, in one aspect, as shown in FIG. 4, spike tip 12 may be threaded onto tube 16. For example, in one aspect, spike tip 12 may include an external thread sized and adapted to engage an internal thread on tube 16. In one aspect, the threaded engagement of spike tip 12 with tube 16 may facilitate removal of spike tip 12 from tube 16, for example, to replace a damaged spike tip and/or to replace one spike tip 12 having one shape and/or orifice size, and/or number of orifices 14 and/or orifice configuration with another spike tip 12 having a different shape and/or orifice size, and/or number of orifices 14, and/or orifice configuration. According to an aspect of the invention, fire spike assemblies 10 and fire spike assembly kits are provided having two or more interchangeable spike tips 12.

According to an aspect of the invention, fire spike assembly 10 shown in FIGS. 2 through 4 may have a length 36 ranging from 12 inches to about 10 feet, but is typically from 2 feet to 6 feet long, for example, 29 inches long. Though the elongated conduit 16 shown in FIGS. 2 through 4 may typically be substantially straight, in one aspect, the elongated conduit 16 may include a bend or an elbow, for example, a 45-degree bend or a 90-degree bend, for instance, at about mid-length. This bend in fire spike assembly 10 can facilitate the user penetrating a surface that cannot be directly accessed, for example, a window or a door above or below the location of the firefighter.

Figure 6:
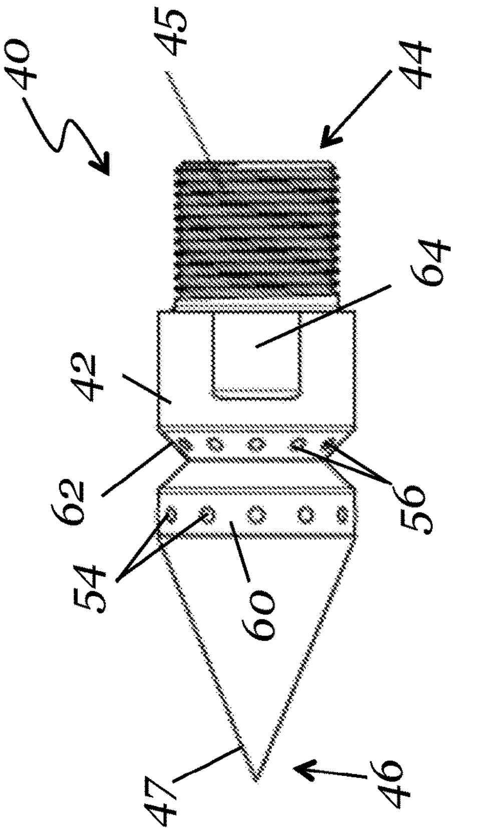
FIG. 6 is a left-side elevation view of the fire spike tip shown in FIG. 5, the right-side elevation view being a mirror image thereof.
Figure 7:
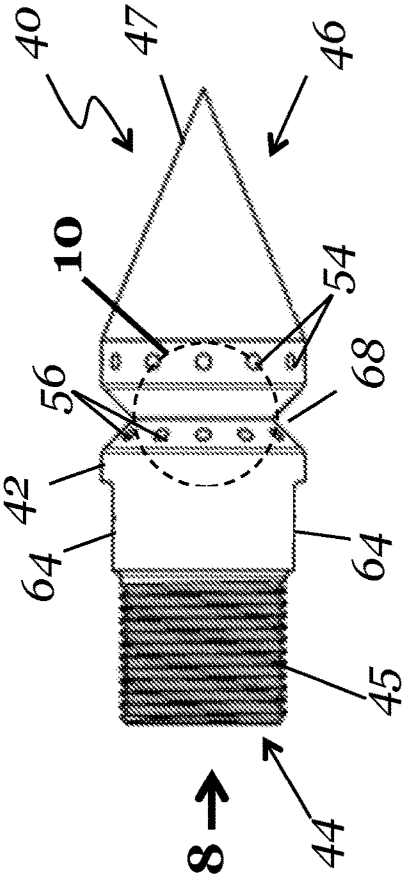
FIG. 7 is a top view, rotated 180 degrees, of the fire spike tip shown in FIG. 6.
Figure 5:
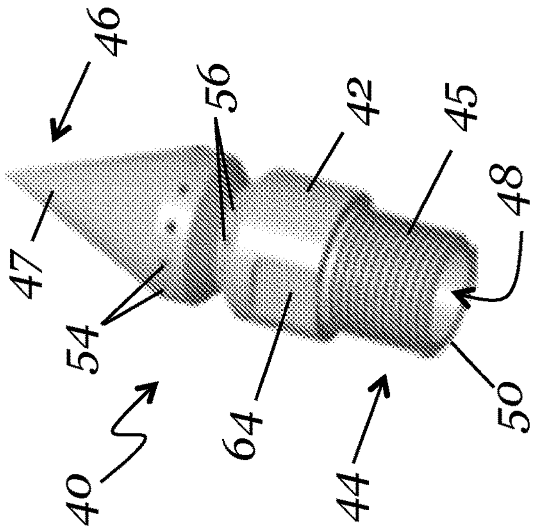
FIG. 5 is a perspective view of one fire spike tip according to one aspect of the invention that may be used in the fire spike assembly shown in FIGS. 2 through 4.
Figure 8:
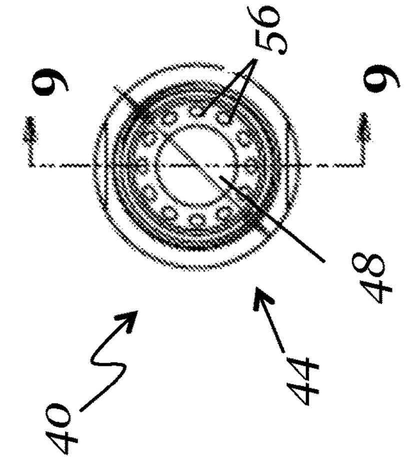
FIG. 8 is an end view of the fire spike tip shown in FIG. 7 as viewed along view line 8 shown in FIG. 7.
Figure 9:
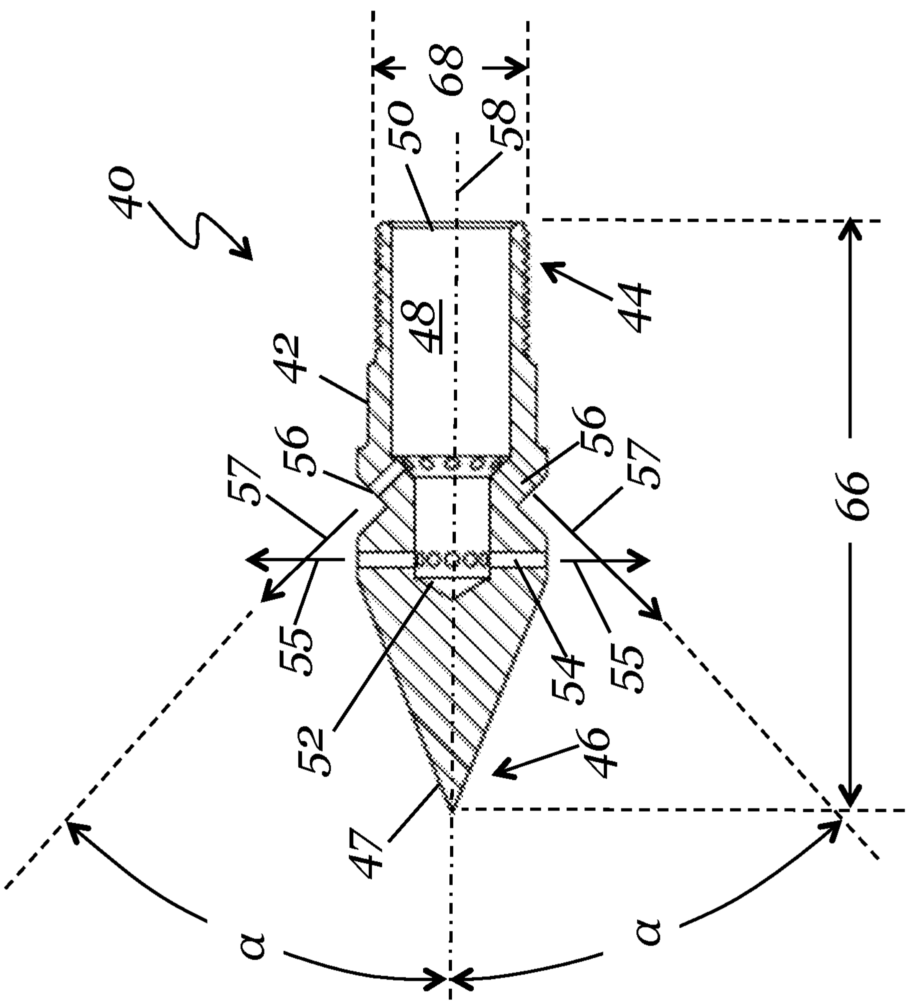
FIG. 9 is a cross-sectional view of the fire spike tip shown in FIG. 8 as sectioned through section view 9-9 shown in FIG. 8.

FIG. 5 is a perspective view of one fire spike tip 40 according to one aspect of the invention that may be used in the fire spike assembly 10 shown in FIGS. 2 through 4. Fire spike tip 40 may function as a "shield" nozzle as known in the art. FIG. 6 is a left-side elevation view of fire spike tip 40 shown in FIG. 5, the right-side elevation view being a mirror image thereof. FIG. 7 is a top view, rotated 180 degrees, of fire spike tip 40 shown in FIG. 6, and FIG. 8 is an end view of fire spike tip 40 shown in FIG. 7 as viewed along view line 8 shown in FIG. 7. FIG. 9 is a cross-sectional view of the fire spike tip 40 shown in FIG. 8 as sectioned through section view 9-9 shown in FIG. 8.

As shown in FIGS. 5 through 9, spike tip 40 typically comprises or includes a cylindrical body 42 having a first end 44 adapted to be received by tube 16 of fire spike assembly 10 shown in FIGS. 2 through 4, and a second end 46 having a pointed projection 47 adapted to penetrate a surface, for example, when fire spike assembly 10 is under a load on striking head 18. The cylindrical body 42 includes an internal cavity 48 having an open first end 50 and a closed second end 52 (see FIG. 9). In one aspect, internal cavity 48 may be circular or non-circular, for example, square in cross section. In one aspect, internal cavity 48 may have an inside dimension, for example, an inside diameter, ranging from about 0.125 inches to about 5 inches, depending upon the application, but is typically between about 0.25 inches and about 2 inches in inside dimension, for example, 0.531 inches in inside diameter As shown in FIGS. 5 through 9, according to aspects of the invention spike tip 40 includes through holes or orifices 54 and 56. Orifices 54 and 56 communicate with, or are in fluid communication with, internal cavity 48 and are adapted to discharge fluid, for example, water or other fire suppressant, in a pre-defined direction. As shown most clearly in FIG. 9, according to aspects of the invention, orifices 54, or a plurality of first orifices, are directed in a first substantially radial direction 55 to provide a plurality of fluid flows from orifices 54 in a substantially radial direction, and orifices 56, or a plurality of second orifices, are directed in a second direction 57 to provide a plurality of fluid flows from orifices 56 in second direction 57. According to aspects of the invention, the second direction 57 at least partially intersects with the first direction 55, though in one aspect these directions may not intersect. For example, in one aspect, the second direction 57 of orifices 56 and the flow from orifices 56 at least partially intersects with at least of one first direction 55 of one of the first orifices 54 and the flow from orifices 54. However, according to one aspect, the second direction 57 of orifices 56 and the flow from orifices 56 at least partially intersects with a plurality of the first directions 55 of the first orifices 54 and the flow from orifices 54. Preferably, each of the second directions 57 of orifices 56 and the flow from orifices 56 intersects with a corresponding first direction 55 of the first orifice 54 and the flow from orifices 54.

According to one aspect of the invention, the substantially radial direction 55 of orifices 54 and the substantially radial direction 55 of the flow of fluid from orifices 55 may be substantially perpendicular to the axis 58, for example, a longitudinal axis, of spike tip 40, or the axis 58 of the cylindrical body 42 of spike tip 40. Though preferably substantially perpendicular to the axis 58, it is envisioned that the orientation of orifices 54 and the direction of flow 55 may vary from 90 degrees from the axis 58, for example, the orientation and direction may range from 85 degrees to 95 degrees from axis 58 while providing the desired dispersion of fluid, or from 88 degrees to 92 degrees while providing the desired dispersion of fluid.

According to one aspect of the invention, the direction 57 of orifices 56 and the direction 57 of the flow of fluid from orifices 56 may vary broadly while maintaining at least partial intersection with the direction 55 of orifices 54 and the flow of fluid out of orifices 54. In one aspect, the direction 57 may define an angle $\alpha$ with the axis 58. The angle $\alpha$ may range from 15 degrees to 75 degrees, but typically may be between 30 degrees and 60 degrees, for example, between 40 degrees and 50 degrees, for instance, about 45 degrees.

In the aspect of the invention shown in FIGS. 5 through 9, the orifices 54 are positioned in an external surface 60 (see FIG. 6) of cylindrical body 42 and the orifices 56 are position in a recessed surface 62, for example, an annular, beveled recessed surface 68, of cylindrical body 42. However, it is envisioned that the outlets of orifices 54 and 56 may be positioned on a broad range of surfaces and surface orientations without detracting from the desired dispersion of fluid. For example, the outlets of orifices 54 may be positioned in a recess in a surface of the cylindrical body 42, for example, an annular recess, where the outlets of orifices 54 are positioned below the outer surface of body 42. In another aspect, orifices 56 may have outlets on the outer surface of cylindrical body 42, for example, on a surface that is not recessed, while being directed in the direction 57.

In another aspect of the invention, orifices 54 and/or orifices 56 may not comprise substantially uniform dimensioned through holes in body 42, but may include restrictions or expansions, for example, restrictions narrower in dimension than a nominal dimension of orifice 54 and/or 56, or an expansion larger in dimension than the nominal dimension of orifices 54 and/or 56. In one aspect, the restrictions or expansions may be proximate or positioned at or near the outlet of orifices 54 and/or 56. In addition, though in one aspect, as shown in FIGS. 5 through 9, orifices 54 and/or orifices 56 may comprise holes having circular cross sections, in other aspects of the invention, orifices 54 and/or orifices 56 may be non-circular, for example, oval, square, or rectangular in cross section.

The number and size of orifices 54 and 56 provided in spike tip 40 may vary depending upon the size and flow requirements of the flow of fluid from spike assembly 10. As shown in FIGS. 5 through 9, in one aspect, 12 orifices 54 and 12 orifices 56 may be provided. In other aspects, the number of orifices 54 and 56 may range from 2 to 100, but the number of orifices 54 and 56 may typically range from 8 to 36.

Though in one aspect of the invention, as shown in FIGS. 5 through 9, orifices 54 and 56 may be provided as a single row of orifices, in other aspects each of orifices 54 and 56 may be provided in two or more rows of orifices. In one aspect the two or more rows of orifices 54 and 56 may be "staggered" or "non staggered." For example, staggered rows of orifices may have centerlines that do not overlap, that is, their centerlines may be offset, for example, offset substantially halfway between the orifices of an adjacent row of orifices. In one aspect, the number of orifices 54 may vary from the number of orifices 56, though in other aspects the number of orifice 54 may be the same as the number of orifices 56.

In one aspect, orifices 54 and orifices 56 may be equally spaced about cylindrical body 42; however, in other aspects, orifices 54 and orifices 56 may not be equally spaced about cylindrical body 42, but may be spaced at predetermined varying intervals.

In one aspect, orifices 54 and orifices 56 may have an inside dimension, for example, an inside diameter, ranging from about 0.01 inches to about 0.25 inches, depending upon the application, but typically have an inside dimension of between about 0.050 inches and about 0.100 inches in inside dimension, for example, 0.062 inches in inside diameter.

As shown in FIGS. 5 through 9, the second end 46 of cylindrical body 42 may comprise a pointed projection 47, for example, adapted to penetrate a surface or barrier, such as, a door or a wall. In one aspect, pointed projection 47 may be a circular conical projection having an apex angle. In other aspects, pointed projection 47 may be a polygonal conical projection, for example, a square or a rectangular frusto-conical projection, having an apex angle. In the aspect shown in FIGS. 5 through 9, the apex angle of pointed projection 47 is about 22.5 degrees; however, according to other aspects of the invention, the apex angle of pointed projection 47 may range from 15 degrees to 45 degrees.

As shown in FIGS. 5 through 9, the first end 44 of cylindrical body 42 may comprise a set of threads 45, for example, external threads adapted to engage internal threads in tube 16 of fire spike assembly 10 shown in FIGS. 2 through 4. Threads 45 may comprise any suitable conventional thread form. For example, in one aspect threads 45 may comprise UN, UNC, or UNF threads, or their equivalent, for instance, having a thread pitch of 8 to 24, such as, 20.

In one aspect, cylindrical body 42 may include 2 or more "wrench flats" 64, that is, planar depressions in cylindrical body 42 that facilitate engagement with a tool. For example, wrench flats 64 may be provided to facilitate engaging a wrench to remove spike tip 40 from, for example, tube 16 of fire spike assembly 10 shown in FIGS. 2 through 4.

Spike tip 40 may be made from any conventional material that can withstand the expected loading when, for example, spike tip 40 is driven into a surface or through a barrier. However, typically, due to the expected loading, spike tip 40, and any spike tip disclosed herein, may typically be made from a metal. In one aspect, spike tip 40, and any spike tip discussed herein, may be made from iron, steel, stainless steel, aluminum, titanium, nickel, magnesium, brass, or any other structural metal. In one aspect, spike tip 40 may be fabricated from stainless steel, for example, 304, 304L, or 316 stainless steel.

In one aspect, spike tip 40 may have a length 66 (see FIG. 9) ranging from about 0.50 inches to about 2 feet, depending upon the application, but is typically between about 2 inches and about 5 inches in length, for example, 2.63 inches in length. In one aspect, spike tip 40 may have a diameter 68 (see FIG. 9) ranging from about 0.50 inches to about 6 inches, depending upon the application, but is typically between about 0.25 inches and about 2 inches in diameter, for example, 0.84 inches in diameter.

According to aspects of the invention, the at least partial intersection of the direction of flow 55 from orifices 54 with the direction of flow 57 from orifices 56 enhances the characteristics of the resulting spray, dispersion, or distribution of fluid to enhance the fire suppression characteristics of aspects of the invention compared to the prior art. The qualification of this enhanced performance will be discussed below in the section entitled "Testing and Performance."

Figure 10:
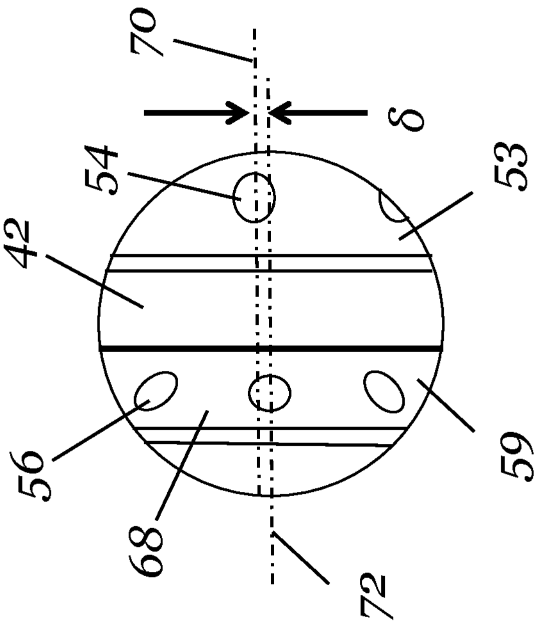
FIG. 10 is a detailed view of the fire spike tip shown in FIG. 7 as identified by Detail 10 shown in FIG. 7.

FIG. 10 is a detailed view of the fire spike tip shown in FIG. 7 as identified by Detail 10 shown in FIG. 7. FIG. 10 illustrates one example of the offset of the location of the orifices 54 and 56 that may result in the desired at least partial intersection of the flow of fluid in the direction 55 from orifices 54 and the flow of fluid in the direction 57 from orifices 56 to provide the desired enhanced resulting spray, dispersion, or distribution of fluid.

The detailed view shown in FIG. 10 illustrates a portion of cylindrical body 42 about the location of orifices 54 and 56. FIG. 10 illustrates a typical representative centerline 70 of one orifice 54 and a typical representative centerline 72 of one orifice 56. According to one aspect of the invention, the centerlines 72 of at least some, but preferably all, of orifices 56 are offset from the centerline 70 of orifices 54 by a dimension S. According to one aspect of the invention, this offset dimension S results in a predetermined misalignment of the flows of fluid in the direction 55 out of orifices 54 and the flows of fluid in the direction 57 out of orifices 56 to provide a desired contact and dispersion of fluid spray from spike tip 40, for example, to provide a desired droplet size and/or distribution parameter, N. (See the discussion of distribution parameter, N, below.) In one aspect, the offset dimension δ may range from about 0.010 inches to about 0.250 inches, depending, for example, on the size of orifices 54 and 56. In one aspect, the offset dimension δ may range from about 0.025 inches to about 0.100 inches. In another aspect, the offset dimension δ may comprise a percentage of the dimension, for example, of the diameter or width of orifices 54 and/or orifices 56. For example, in one aspect, the offset dimension δ may comprise 1% to 100% of the inside dimension of orifices 54 and/or orifices 56. In one aspect, the offset dimension δ may comprise 25% to 75% of the inside dimension of orifices 54 and/or orifices 56. In one aspect of the invention, the offset dimension δ may be varied to vary the droplet size and/or distribution parameter, N.

In one aspect of the invention, with respect to FIG. 10, orifices 54 and/or orifices 56 may be mounted to movable housings, for example, movable rings, where the offset dimension δ, and, it is envisioned, the distribution parameter, N, can be varied. For example, in one aspect, orifices 54 may be provided in a ring 53 and/or orifices 56 may be provided in a ring 59 (see FIG. 10) where either one or both rings 53 and/or 59 may be rotatable relative to cylindrical body 42. In one aspect, rings 53 and 59 may be annular rings adapted to rotate within an annular recess in cylindrical body 42, for example, rings 53 and 59 may have an inside diameter bearing against a base of an annular recess in cylindrical body 42 and an outside diameter substantially collinear or flush with the outside diameter of a portion of cylindrical body 42. In one aspect, the rings 53 and 59 may include one or more setscrews adapted to retain rings 53 and 59 in a desired position, for example, with a desired offset dimension δ. The one or more setscrews may be radially directed through ring 53 and/or ring 59 and, for example, bear against the base of the annular recess in the cylindrical body 42. In one aspect, ring 53 and/or ring 59 may include one or more indicia representative of the offset dimension δ, the distribution parameter N, and/or some other characteristic of the resulting fluid dispersion pattern produced as the ring 53 and/or ring 59 is rotated. The indicia on ring 53 and/or ring 59 may be adapted to cooperate with corresponding indicia on the adjacent surface of cylindrical body 42, for example, the indicia may be projecting or recessed lines, projecting or recessed bars, indicative color bars, and the like. In one aspect, the ring 53 and/or 59 may include one or more detents that momentarily detain the rotation of ring 53 and/or ring 59 when their rotated position corresponds to a desired characteristic of the flow or fluid dispersion produced and/or an offset dimension S.

Figure 12:
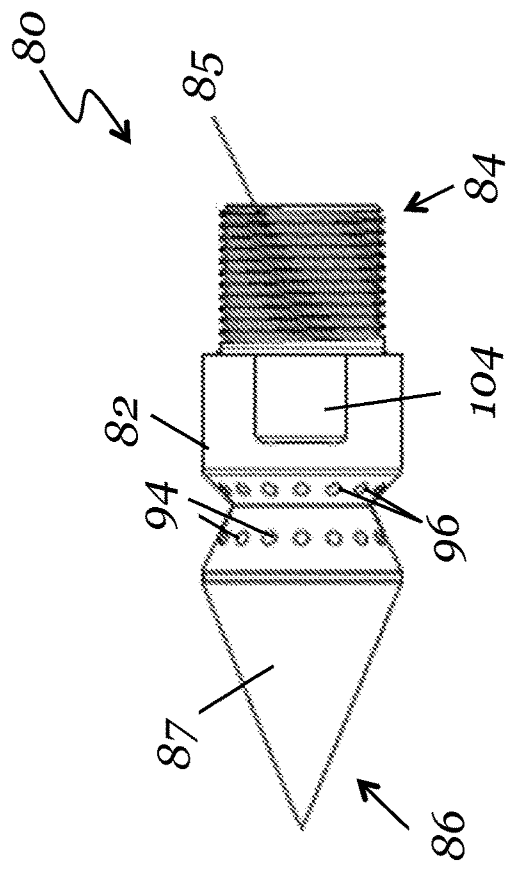
FIG. 12 is a left-side elevation view of the fire spike tip shown in FIG. 11, the right-side elevation view being a mirror image thereof.
Figure 13:
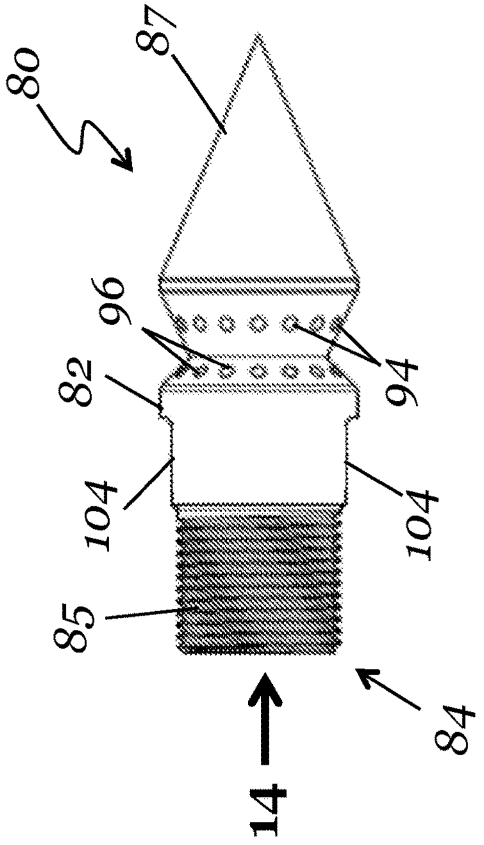
FIG. 13 is a top view, rotated 180 degrees, of the fire spike tip shown in FIG. 12.
Figure 11:
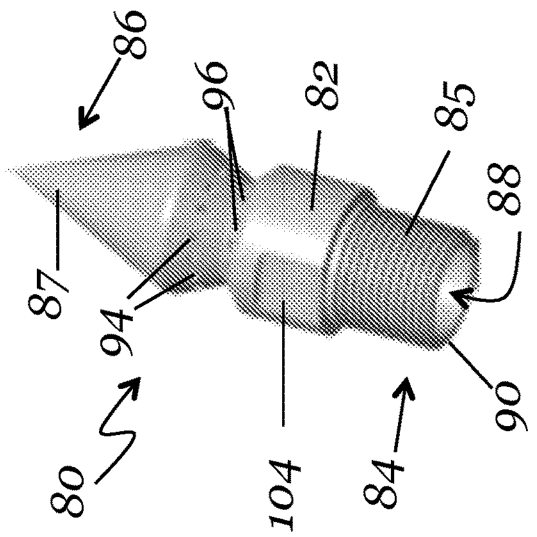
FIG. 11 is a perspective view of another fire spike tip according to one aspect of the invention that may be used in the fire spike assembly shown in FIGS. 2 through 4.
Figure 14:
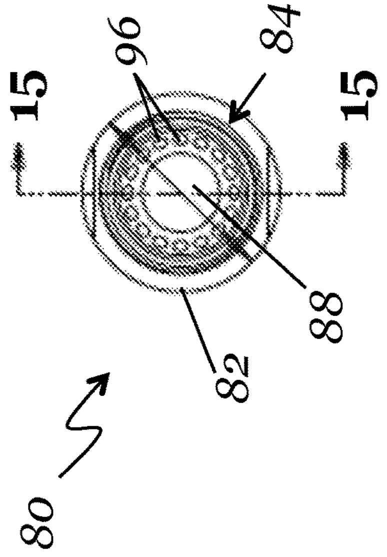
FIG. 14 is an end view of the fire spike tip shown in FIG. 13 as viewed along view line 14 shown in FIG. 13.
Figure 15:
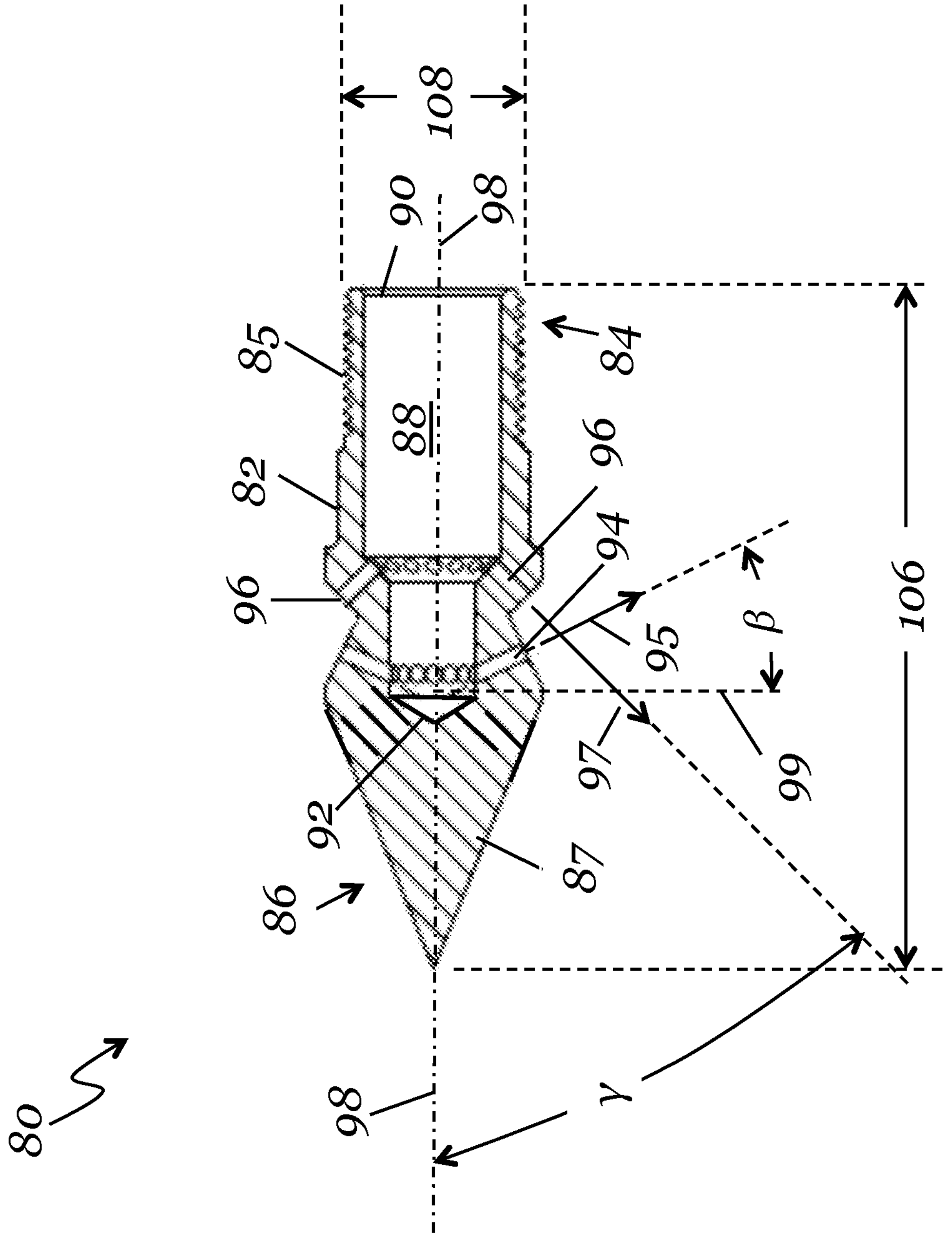
FIG. 15 is a cross-sectional view of the fire spike tip shown in FIG. 14 as sectioned through section view 15-15 shown in FIG. 14.

FIG. 11 is a perspective view of another fire spike tip 80 according to one aspect of the invention that may be used in the fire spike assembly 10 shown in FIGS. 2 through 4. Fire spike tip 80 may function as a "shield" nozzle as known in the art. FIG. 12 is a left-side elevation view of fire spike tip 80 shown in FIG. 11, the right-side elevation view being a mirror image thereof. FIG. 13 is a top view, rotated 180 degrees, of fire spike tip 80 shown in FIG. 12, and FIG. 14 is an end view of fire spike tip 80 shown in FIG. 13 as viewed along view line 14 in FIG. 13. FIG. 15 is a cross-sectional view of the fire spike tip 80 shown in FIG. 14 as viewed through section view 15-15 shown in FIG. 14.

As shown in FIGS. 11 through 15, spike tip 80 may be similar in construction and function to spike tip 40 disclosed here. Spike tip 80 typically comprises or includes a cylindrical body 82 having a first end 84 adapted to be received by spike tip tube 16 of fire spike assembly 10 shown in FIGS. 2 through 4, and a second end 86 having a pointed projection 87 adapted to penetrate a surface, for example, a wall or a door, for instance, when fire spike assembly 10 is under a load on striking head 18. The cylindrical body 82 includes an internal cavity 88 having an open first end 90 and a closed second end 92 (see FIG. 15). In one aspect, internal cavity 88 may be circular or non-circular, for example, square in cross section. In one aspect, internal cavity 88 may have an inside dimension, for example, an inside diameter, having a range of dimension similar to internal cavity 48 disclosed herein. For example, internal cavity 88 may have an inside diameter of 0.531 inches.

As shown in FIGS. 11 through 15, according to this aspect of the invention, spike tip 80 includes through holes or orifices 94 and 96. In contrast to spike tip 40 shown in FIGS. 5 through 10, orifices 94 are not directed substantially radially, as orifices 54 are, but, in this aspect, orifices 94 are directed at an angle to a plane 99 perpendicular to an axis 98, for example, a longitudinal axis, of cylindrical body 82. However, even though directed at an angle, orifices 94 and 96 may provide the enhanced fluid dispersion that characterizes aspects of the invention.

Orifices 94 and 96 communicate with, or are in fluid communication with, internal cavity 88 and are adapted to discharge fluid, for example, water, in a pre-defined direction. As shown most clearly in FIG. 15, according to aspects of the invention, orifices 94, or a plurality of first orifices, are directed in a first direction 95 to provide a plurality of fluid flows from orifices 94 in a first direction 95; and orifices 96, or a plurality of second orifices, are directed in a second direction 97 to provide a plurality of fluid flows from orifices 96 in second direction 97.

In a fashion similar to the flow from orifices 54 and 56 disclosed herein, according to aspects of the invention, the flow of fluid in the second direction 97 at least partially intersects with the flow of fluid in the first direction 95. For example, in one aspect, the flow of fluid in the second direction 97 from orifices 96 at least partially intersects with the flow of fluid in the first direction 95 from at least one of the first orifices 94. However, according to one aspect, the flow in the second direction 97 from orifices 96 at least partially intersects with a plurality of the flows in the first direction 95 from the first orifices 94. Preferably, each of the flows in the second direction 97 from orifices 96 at least partially intersects with a corresponding flow from a first direction 95 from a first orifice 94.

According to one aspect of the invention, the first direction 95 of orifices 94 and the substantially radial direction 95 of the flow of fluid from orifices 95 may be directed at an angle β to the plane 99 perpendicular to the axis 98 of the cylindrical body 82 of spike tip 80. The angle β may range from 10 degrees to 85 degrees from plane 99, but may typically range from 15 degrees to 45 degrees, for example, about 25 degrees.

According to one aspect of the invention, the direction 97 of orifices 96 and the direction 97 of the flow of fluid from orifices 96 may vary broadly while maintaining at least partial intersection with the flow in the direction 95 of orifices 94. In one aspect, the direction 97 may define an angle γ with the axis 98. The angle γ may range from 15 degrees to 75 degrees, but typically may be between 30 degrees and 60 degrees, for example, between 40 degrees and 50 degrees, for instance, about 45 degrees.

Orifices 94 and 96 may have all the attributes, for example, dimensions, orientations, and shapes, of orifices 54 and 56 disclosed herein.

For example, in the aspect of the invention shown in FIGS. 11 through 15, the orifices 94 and 96 may be positioned or located in a manner similar or identical to the positioning and locating of orifices 54 and 56 disclosed herein. For example, orifices 94 and 96 may be positioned on an external surface of cylindrical body 92 or be positioned on a recessed surface, for example, positioned on the annular, beveled recessed surface 68 of cylindrical body 42 shown in FIGS. 5 through 9.

Also, in a fashion similar or identical to orifices 54 and 56, orifices 94 and/or orifices 96 may not comprise substantially uniformly dimensioned through holes in body 42, but may include restrictions or expansions, and may be circular or non-circular in cross section.

The number of orifices 94 and 96 may be similar or identical to the number of orifices 54 and 56 and may vary depending upon the size and flow requirements of the water spike assembly 10. In the aspect shown in FIGS. 11 through 15, the number of orifices 94 and 96 may range from 2 to 100, but the number of orifices 94 and 96 may typically range from 8 to 36.

The configuration of orifices 94 and 96 may be similar or identical to the configurations of orifices 54 and 56 disclosed herein. For example, orifices 94 and 96 may be provided as a single row of orifices, or two or more rows of orifices, which may be staggered or non-staggered, as disclosed herein. Also, the number of orifices 94 may vary from the number of orifices 96, though in other aspects the number of orifice 94 may be the same as the number of orifices 96. Orifices 94 and orifices 66 may be equally spaced about cylindrical body 82, or not be equally spaced about cylindrical body 82.

The size of orifices 94 and 96 may be similar or identical to orifices 54 and 56, and these sizes may vary depending upon the size and flow requirements of the water spike assembly 10. Orifices 94 and orifices 96 may have an inside dimension, for example, an inside diameter, ranging from about 0.01 inches to about 0.25 inches, but typically have an inside dimension of between about 0.050 inches and about 0.100 inches in inside dimension, for example, 0.062 inches in inside diameter.

As shown in FIGS. 11 through 15, the second end 86 of cylindrical body 82 may be similar in size and shape to the second end 46 of spike end 40 disclosed herein. For example, second end 86 may comprise a pointed projection 87, for example, adapted to penetrate a surface or barrier. Pointed projection 87 may be a circular conical projection or a polygonal conical projection having an apex angle, for example, an apex angle ranging from 15 degrees to 45 degrees.

As shown in FIGS. 11 through 15, the first end 84 of cylindrical body 82 may be similar in size and shape to the first end 44 of spike tip 40 disclosed herein. For example, the first end 84 of cylindrical body 82 may comprise a set of threads 85, for example, external threads adapted to engage internal threads in tube 16 of fire spike assembly 10 shown in FIGS. 2 through 4.

Also, similar to cylindrical body 42, cylindrical body 82 may include 2 or more "wrench flats" 104, that is, planar depressions in cylindrical body 82 that facilitate engagement with a tool.

Spike tip 80 may be made from anyone of the conventional materials from which spike tip 40 can be made as disclosed herein. For example, spike tip 80 may be fabricated from stainless steel, for example, 304 stainless steel.

In one aspect, spike tip 80 may have dimensions similar or identical to the dimensions of spike tip 40 disclosed herein. For example, spike tip 80 may have a length 106 (see FIG. 15) between about 2 inches and 5 about inches in length, for example, 2.63 inches in length, and spike tip 80 may have a diameter 108 (see FIG. 9) typically between about 0.25 inches and about 2 inches in diameter, for example, 0.840 inches in diameter.

According to aspects of the invention shown in FIGS. 11 through 15, the at least partial intersection of the fluid flow in the direction 95 from orifices 94 with the direction of fluid flow in the direction 97 from orifices 96 enhances the characteristics of the resulting spray, dispersion, or distribution of fluid to enhance the fire suppression characteristics of aspects of the invention compared to the prior art.

According to aspects of the invention shown in FIGS. 11 through 15, centerlines of orifices 94 and 96 may have the offset dimension δ and the range of values of offset dimension δ, and the rotatable rings, disclosed and discussed with respect to FIG. 10.

Figure 17:
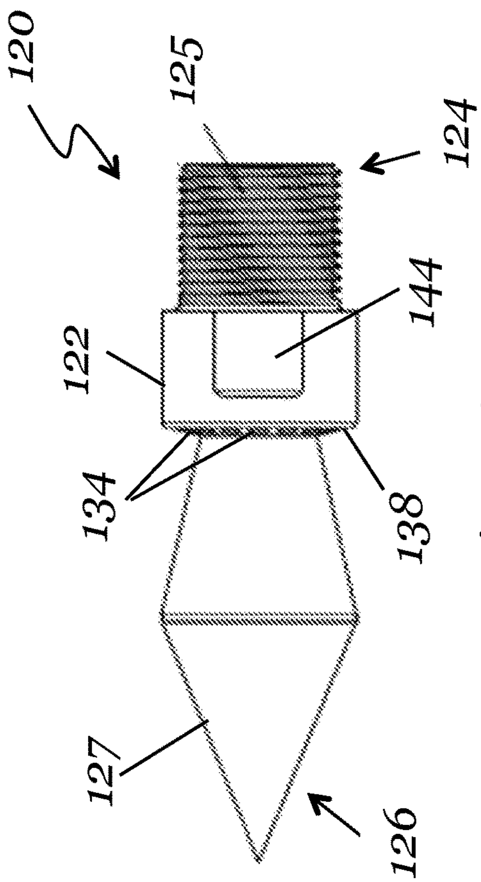
FIG. 17 is a left-side elevation view of the fire spike tip shown in FIG. 16, the right-side elevation view being a mirror image thereof.
Figure 18:
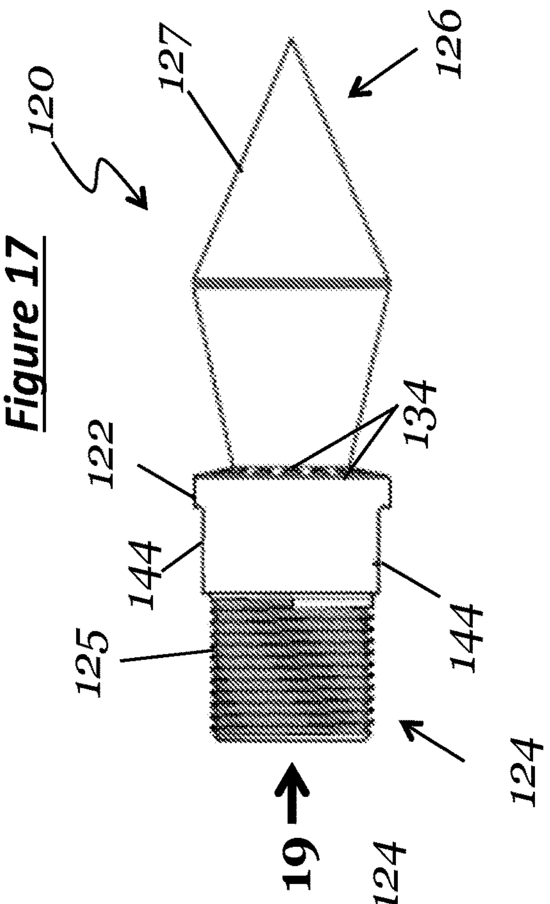
FIG. 18 is a top view, rotated 180 degrees, of the fire spike tip shown in FIG. 17.
Figure 16:
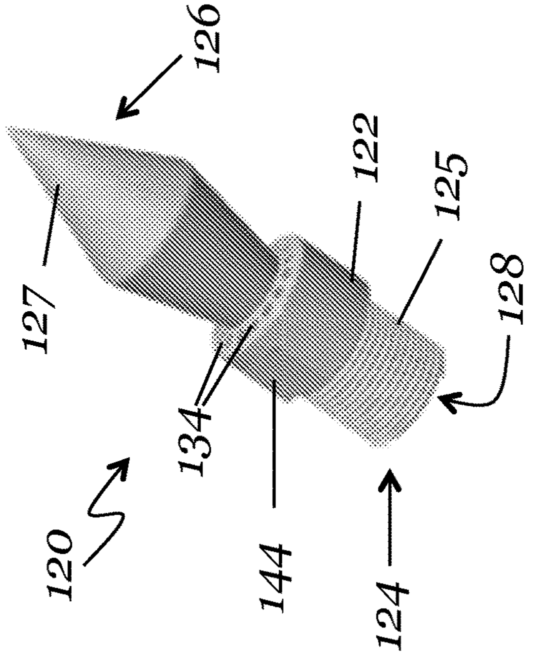
FIG. 16 is a perspective view of another fire spike tip according to one aspect of the invention that may be used in the fire spike assembly shown in FIGS. 2 through 4.
Figure 19:
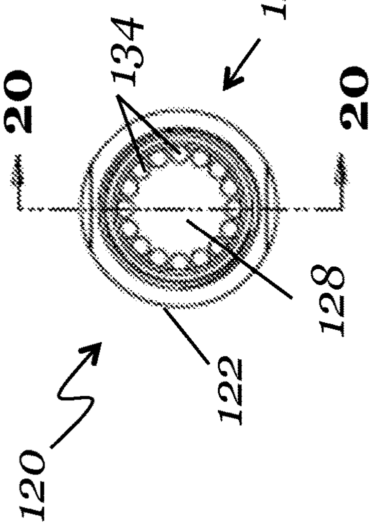
FIG. 19 is an end view of the fire spike tip shown in FIG. 18 as viewed along view line 19 shown in FIG. 18.
Figure 20:
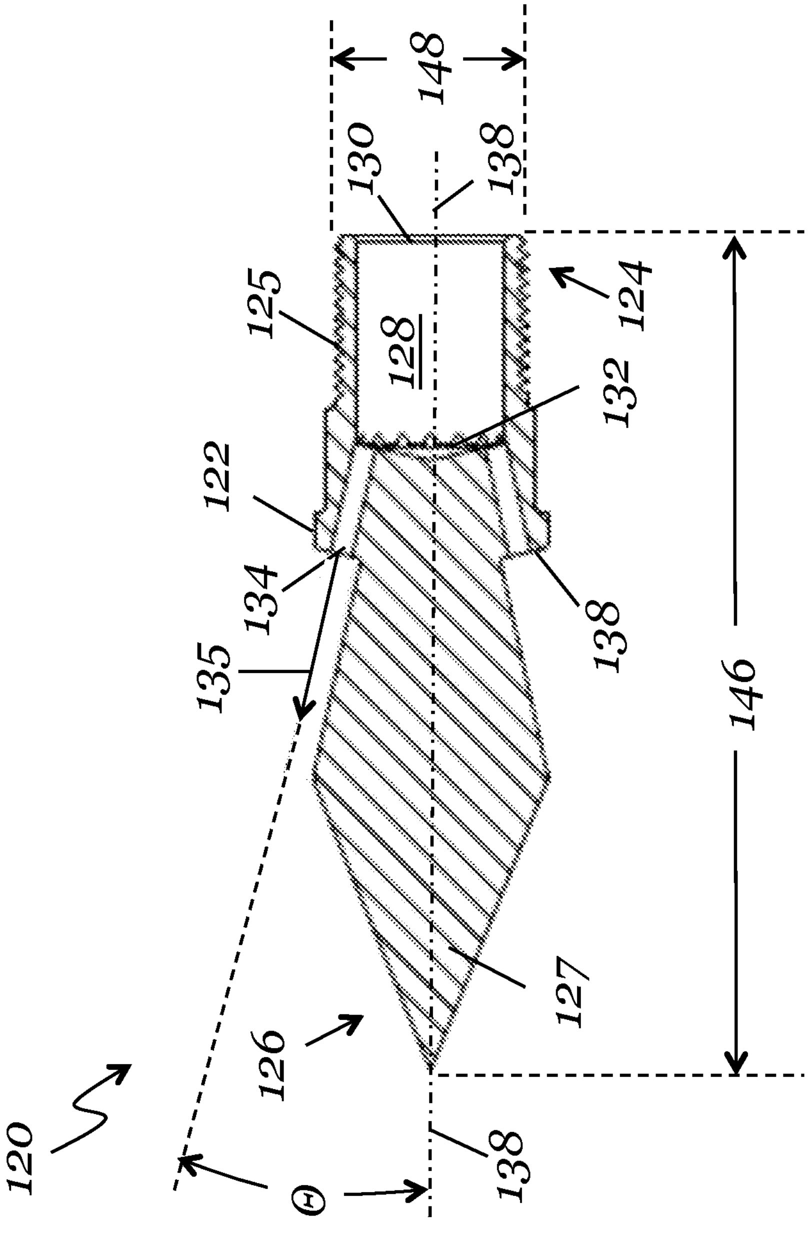
FIG. 20 is a cross-sectional view of the fire spike tip shown in FIG. 19 as sectioned through section view 20-20 shown in FIG. 19.

FIG. 16 is a perspective view of another fire spike tip 120 according to another aspect of the invention that may be used in the fire spike assembly 10 shown in FIGS. 2 through 4. Fire spike tip 120 may function as an "attack" nozzle as known in the art. FIG. 17 is a left-side elevation view of fire spike tip 120 shown in FIG. 16, the right-side elevation view being a mirror image thereof. FIG. 18 is a top view, rotated 180 degrees, of fire spike tip 120 shown in FIG. 17, and FIG. 19 is an end view of fire spike tip 120 shown in FIG. 18 as viewed along view line 19 in FIG. 18. FIG. 20 is a cross-sectional view of the fire spike tip 120 shown in FIG. 19 as viewed through section view 20-20 shown in FIG. 19.

As shown in FIGS. 16 through 20, spike tip 120 may be similar in construction and function to spike tips 40 and 80 disclosed here. Spike tip 120 typically comprises or includes a cylindrical body 122 having a first end 124 adapted to be received by tube 16 of fire spike assembly 10 shown in FIGS. 2 through 4, and a second end 126 having a pointed projection 127 adapted to penetrate a surface, for example, a door or a wall, for instance, when fire spike assembly 10 is under a load on striking head 18. The cylindrical body 122 includes an internal cavity 128 having an open first end 130 and a closed second end 132 (see FIG. 20). In one aspect, internal cavity 128 may be circular or non-circular, for example, square in cross section. In one aspect, internal cavity 128 may have an inside dimension, for example, an inside diameter, having a range of dimension similar to internal cavity 48 disclosed herein. For example, internal cavity 128 may have an inside diameter of about 0.531 inches.

As shown in FIGS. 16 through 20, according to this aspect of the invention, spike tip 120 includes through holes or orifices 134. In contrast to spike tips 40 and 80 shown in FIGS. 5 through 10 and FIGS. 12 through 15, respectively, only a single set of orifices 134 is provided in spike tip 120, for example, as is characteristic of an "attack"-type nozzle. As shown, orifices 134 in spike tip 120 may be directed substantially axially, for example, at an angle to the axis of spike tip 120.

Orifices 134 communicate with, or are in fluid communication with, internal cavity 128 and are adapted to discharge fluid, for example, water or another fluid fire suppressant, in a pre-defined direction. As shown most clearly in FIG. 20, according to aspects of the invention, orifices 134, or a first plurality of orifices, are directed in a first direction 135 to provide a plurality of fluid flows from orifices 134 in a first direction 135.

According to one aspect of the invention, the first direction 135 of orifices 134 in the axial direction of the flow of fluid from orifices 134 may be directed at an angle θ relative to the axis 138, for example, a longitudinal axis, of the cylindrical body 122 of spike tip 120. The angle θ may range from 5 degrees to 60 degrees from axis 138, but may typically range from 10 degrees to 20 degrees, for example, about 12.5 degrees.

Orifices 134 may have all the attributes, for example, dimensions, orientations, and shapes, of orifices 54 and 56 disclosed herein.

For example, in the aspect of the invention shown in FIGS. 16 through 20, the orifices 134 may be positioned or located in a manner similar or identical to the positioning and locating of orifices 54 and 56 disclosed herein. For instance, orifices 134 may be positioned on an external surface of cylindrical body 122 or be positioned on a recessed surface, for example, positioned on the annular, beveled recessed surface 138 of cylindrical body 122 shown in FIGS. 16 through 20.

Also, in a fashion similar or identical to orifices 54 and 56, orifices 134 may not comprise substantially uniformly dimensioned through holes in body 122, but may include restrictions or expansions, and may be circular or non-circular in cross section.

The number of orifices 134 may be similar or identical to the number of orifices 54 and 56 and may vary depending upon the size and flow requirements of the water spike assembly 10. In the aspect shown in FIGS. 16 through 20, 16 equally-spaced orifices are provided; however, the number of orifices 134 may range from 2 to 100, but typically the number of orifices 134 may range from 8 to 36.

The configuration of orifices 134 may be similar or identical to the configurations of orifices 54 and 56 disclosed herein. For example, orifices 134 may be provided as a single row of orifices, or two or more rows of orifices, which may be staggered or non-staggered, as disclosed herein. Also, orifices 134 may be equally spaced about cylindrical body 122, or not be equally spaced about cylindrical body 122.

The size of orifices 134 may be similar or identical to orifices 54 and 56, and these sizes may vary depending upon the size and flow requirements of the fire spike assembly 10. Orifices 134 may have an inside dimension, for example, an inside diameter, ranging from about 0.01 inches to about 0.25 inches, but typically have an inside dimension of between about 0.050 inches and about 0.100 inches in inside dimension, for example, 0.079 inches in inside diameter.

As shown in FIGS. 16 through 20, the second end 126 of cylindrical body 122 may be similar in size and shape to the second end of 46 of spike tip 40 or second end 86 of spike tip 80 disclosed herein. For example, second end 126 may comprise a pointed projection 127, for example, adapted to penetrate a surface or barrier, such as, a wall or a door. Pointed projection 127 may be a circular conical projection or a polygonal conical projection having an apex angle, for example, an apex angle ranging from 15 degrees to 45 degrees.

As shown in FIGS. 16 through 20, the first end 124 of cylindrical body 122 may be similar in size and shape to the first end 44 of spike tip 40 or the first end 84 of spike tip 80 disclosed herein. For example, the first end 124 of cylindrical body 122 may comprise a set of threads 125, for example, external threads adapted to engage internal threads in tube 16 of fire spike assembly 10 shown in FIGS. 2 through 4.

Also, similar to cylindrical body 42, cylindrical body 122 may include 2 or more “wrench flats” 144, that is, planar depressions in cylindrical body 122 that facilitate engagement with a tool.

Spike tip 120 may be made from any one of the conventional materials from which spike tips 40 and 80 may be made of, as disclosed herein. For example, spike tip 120 may be fabricated from stainless steel, for example, 304 stainless steel.

In one aspect, spike tip 120 may have dimensions similar or identical to the dimensions of spike tips 40 and 80 disclosed herein. For example, spike tip 120 may have a length 146 (see FIG. 20) between about 2 inches and about 5 inches in length, for example, 3.0 inches in length, and spike tip 120 may have a diameter 148 (see FIG. 20) typically between about 0.25 inches and about 2 inches in diameter, for example, 0.840 inches in diameter.

Testing and Performance

Aspects of the present invention were tested under expected use conditions in order to evaluate their performance, especially with respect to the prior art. As is known in the art, the flow discharge from the orifices from spike tips and the resulting spray patterns can be evaluated for, among other things, fluid spray distribution, fluid spray dispersion, and fluid flux characterization.

Aspects of the present invention were tested by Fire & Risk Alliance, LLC of Rockville, Maryland, and the following performance data were obtained. Table 1 summarizes the aspects of the present invention tested.

TABLE 1

Testing of Aspects of the Invention

| Aspect of the Invention | Identifier | Type of Nozzle | Diameter of Orifices | Number of Orifices |
|---|---|---|---|---|
| 40 (FIGS. 4-10) | FL01B11 | “Shield” | 0.062" | 24 |
| 80 (FIGS. 11-15) | FL01B10 | “Shield” | 0.062" | 32 |
| 120 (FIGS. 16-20) | FL01B09 | “Attack” | 0.079" | 16 |

K-Factor

As known in the art, a relationship exists between flow rate through an orifice (or through a set of orifices) and the pressure drop across the orifice. This relationship is characterized by what is known as a “k-factor,” where values of k-factor can be calculated be Equation 1.

$$Q=k\sqrt{P},\qquad \text{[Equation 1]}$$

where:

Q=Fluid flow rate [gpm];

k=Nozzle k-factor; and

P=Pressure [psi].

As is known in the art, typically, as the pressure (P) increases through an orifice, so must the flow rate (Q) of the fluid trough the orifice. However, it is understood that a slight decline in the effective k-factor of a nozzle or orifice at elevated pressures is to be expected due to increased boundary layer thickness and friction losses occurring within the orifice itself. Thus, the k-factor measured for a nozzle may not be constant and may fluctuate with the operating pressure of the nozzle. Typical k-factors for fire protection nozzles typically can vary ±5% over a range of operating pressures. K-factors for the orifices of the spike tips tested and disclosed herein appear in Table 2 below. As shown, aspects of the present invention have a higher K-factor than the comparable prior art spike tips and thus can provide higher flow rates for a given pressure.

Flow Rate

One basis for comparison of aspects of the present invention is the amount of fluid flow at a given pressure. According to one aspect of the invention, the spike tips disclosed herein provide increased fluid flow compared to the prior art, which can translate to enhanced fire suppression of aspects of the invention. Comparative flow rate (in gpm) at a given pressure (in this case 100 psi) is presented in Table 2 below.

As indicated by the data in Table 2, one embodiment of the present invention, the “shield” spike tip 80 disclosed and described with respect to FIGS. 11-15 (identifier FL01B10 in Table 2) yields 28% more fluid flow at 100 psi than a comparable prior art “shield” spike tip (identifier FL01B02). Also, one embodiment of the present invention, the “attack” spike tip 120 disclosed and described with respect to FIGS. 16-20 (identifier FL01B09 in Table 2) yields 46.5% more fluid flow at 100 psi than a comparable prior art “attack” spike tip (identifier FL01B01).

Drop Size Characterization

Drop size measurements for the “shield”-type spike tips were characterized using a Malvern Spraytec particle size analyzer. This particle size analyzer measures the drop size distribution of sprays with droplets up to 1000 μm in diameter using the technique of laser diffraction. This measurement approach utilizes a collimated HeNe laser focused on a silicon diode detector array. As the subject spray passes through the measurement zone, the light is diffracted and the peripheral sensors on the detector array register a change in signal strength. The distribution of light across the sensor array is related to the drop size distribution associated with the spray.

As is known in the art, the overall drop size distribution of the spray or dispersion of fluid from an orifice (or set of orifices) can be represented as a log-normal distribution and a distribution parameter, N. In particular, it is understood that the smaller values of N indicates a more uniform spray distribution. Distribution parameters, N, for the orifices of the spike tips tested and disclosed herein also appear in Table 2 below.

As indicated by the data in Table 2, the "shield" spike tip 80 disclosed and described with respect to FIGS. 11-15 (identifier FL01B10 in Table 2) is characterized by lower N numbers (2.23, 2.39, 2.39) at varying pressure compared to a comparable prior art "shield" spike tip (identifier FL01B02) having an N of 2.47. Accordingly, aspects of the present invention provide improved uniformity in spray distribution compared to the prior art.

Figure 21:
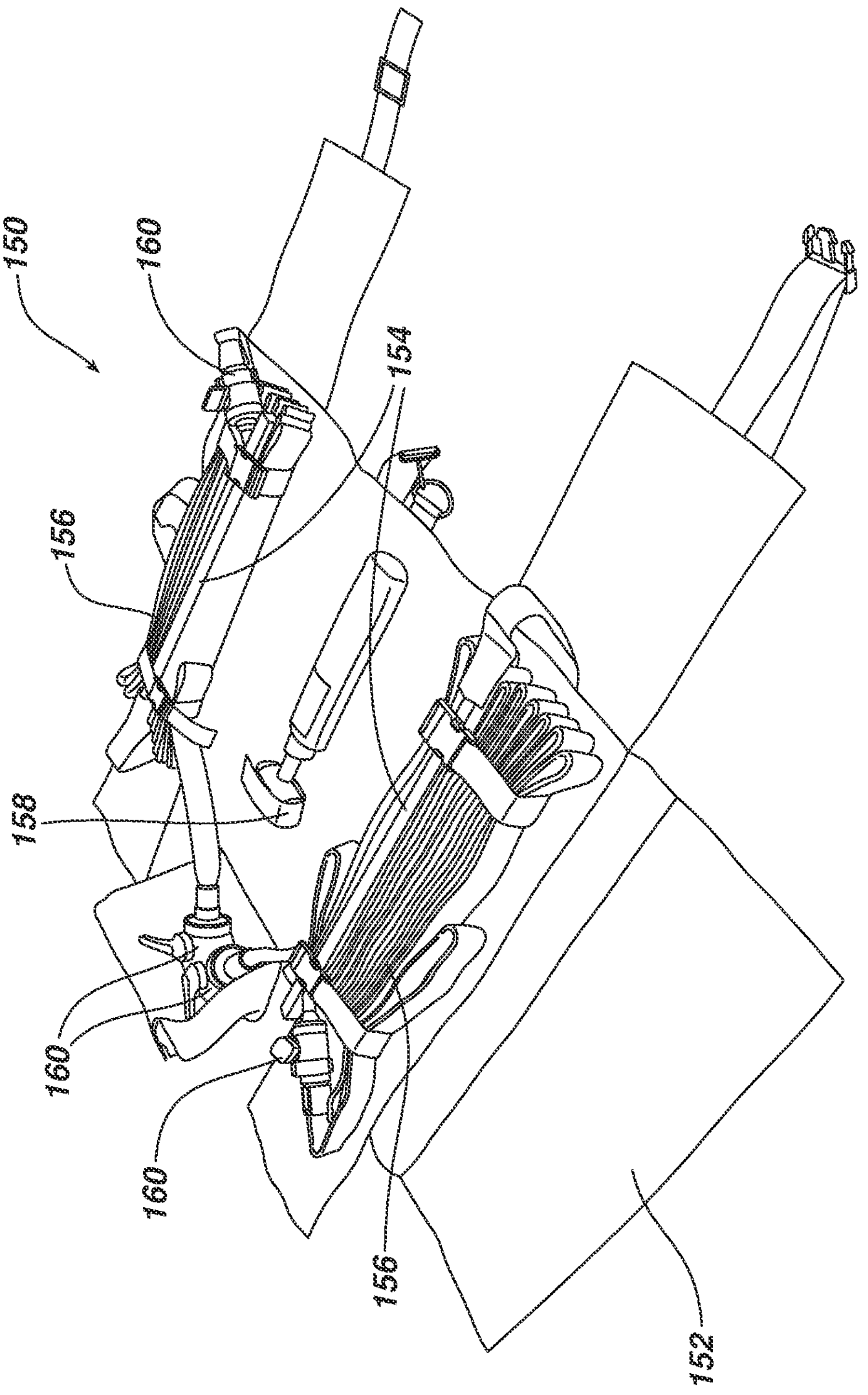
FIG. 21 is a perspective view of an unrolled fire spike assembly kit according to another aspect of the invention.

As shown in FIG. 21, the storage case 152 for kit 150 may be adapted to retain one or more fire spike assemblies 154 (for example, one or more of the fire spike assembly 10 and spike tips 40, 80, and/or 120 disclosed herein), one or more fire hoses 156, one or more hammers 158, and one or more valves 160. In one aspect of the invention, kit 150 may contain one or more, for example, two or more, fire spike tips that can be interchanged on the fire spike tip assemblies 154, for example, one or more fire spike tips 40, 80, and/or 120 disclosed herein.

TABLE 2

Results of Testing of Aspects of the Invention[1]

| Aspect of the Invention | Identifier | Flow Rate (gpm at 100 psi) | Flow Increase Over Prior Art | k-factor (Testing Pressure) [gpm/(psi)$^{1/2}$] | Droplet Size [micrometers] | N (Testing Pressure) |
|---|---|---|---|---|---|---|
| 40 (FIGS. 4-10) | FL01B11 | 18 | | 1.9 (50 psi) | 337.25 | 2.23 (50 psi) |
| 40 (FIGS. 4-10) | FL01B11 | | | NA (75 psi) | | 3.25 (75 psi) |
| 40 (FIGS. 4-10) | FL01B11 | | | 1.8 (100 psi) | | 3.33 (100 psi) |
| 80 (FIGS. 11-15) | FL01B10 | 22.6 | 28% | 2.3 (50 psi) | 230.73 | 2.22 (50 psi) |
| 80 (FIGS. 11-15) | FL01B10 | | | 2.3 (75 psi) | | 2.39 (75 psi) |
| 80 (FIGS. 11-15) | FL01B10 | | | 2.3 (100 psi) | | 2.39 (100 psi) |
| Prior Art - Shield | FL01B02 | 17.7 | | 1.8 | 241.97 | 2.47 |
| 120 (FIGS. 16-20) | FL01B09 | 21.5 | 46.5% | 2.4 (50 psi) | | NA (50 psi) |
| 120 (FIGS. 16-20) | FL01B09 | | | 2.1 (100 psi) | | NA (100 psi) |
| Prior Art - Attack | FL01B01 | 14.7 | | 1.5 | NA | NA |

[1]Fire & Risk Alliance, LLC Report dated Mar. 24, 2018 (included by reference herein in its entirety)

Droplet Size

Table 2 also includes data for relative droplet size of aspects of the present invention compared to the prior art. For example, "shield" spike tip 80 disclosed herein provides a comparable droplet size (230.73 μm) to prior art "shield" spike tip (241.97 μm), while providing 28% greater fluid flow. However, "shield" spike tip 40 disclosed herein provides a droplet size (337.25 μm) that is 39.4% greater than the droplet size of prior art "shield" spike tip (241.97 μm). As is understood in the art, a larger droplet size can relate to a greater capability to suppress fire, where a smaller droplet may be prone to evaporation prior to effectively suppressing a fire.

Kit Embodiments of the Invention

In addition to fire spike assemblies and fire spike tips, aspects of the present invention also include unique kits adapted to retain and/or store the assemblies and tips disclosed herein.

FIG. 21 is a perspective view of an unrolled fire spike assembly kit 150 according to another aspect of the invention. As shown in FIG. 21, kit 150 comprises a uniquely-designed bag, storage, or carrying case 152 having a plurality of pockets, compartments, straps, and attachments for storing or retaining aspects of the present invention, for example, fire spike assemblies and fire spike tips, but also other ancillary equipment, including fire hoses, nozzles, hammers, and related hardware and documentation. In one aspect of the invention, kit 150 may include documentation regarding the proper assembly and use of fire spike assemblies and fire spike tips disclosed herein, for example, manuals, diagrams, and/or specifications.

Figure 22:
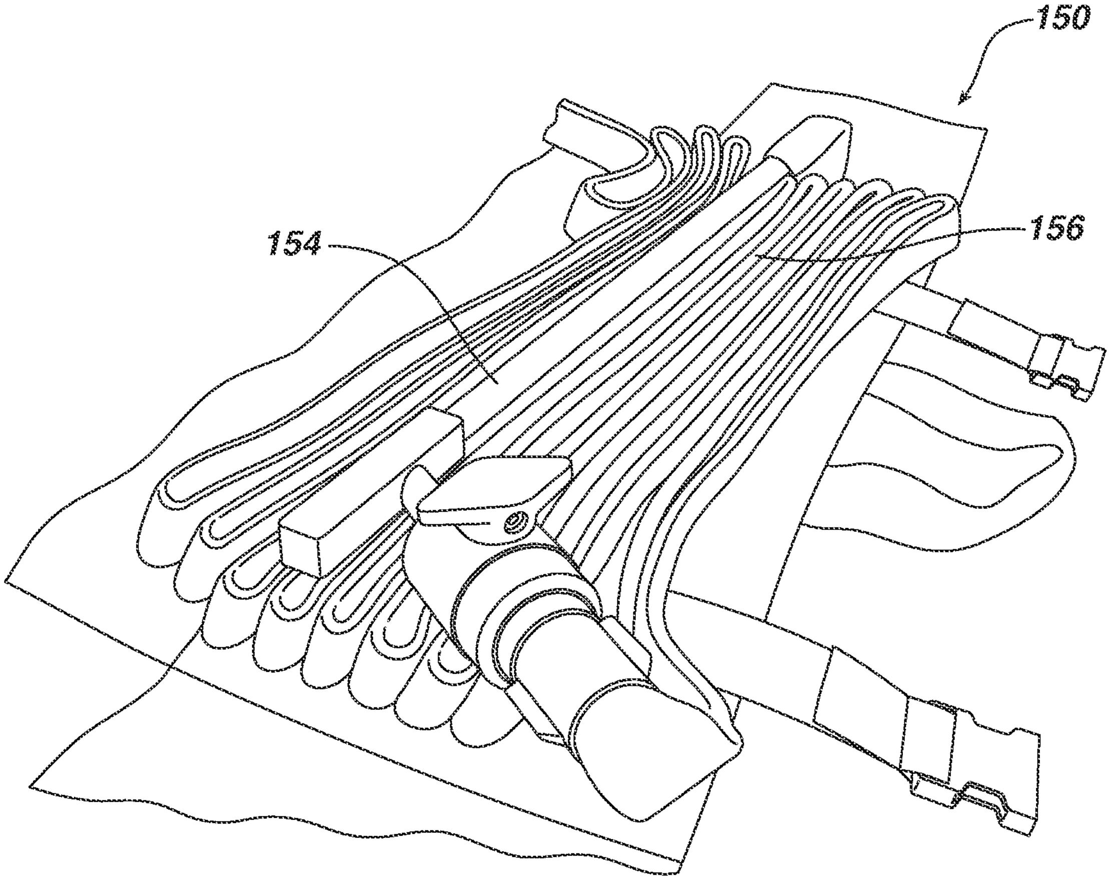
FIG. 22 is a detailed perspective view of the unrolled fire spike assembly kit shown in FIG. 21 having an assembled fire spike assembly according to another aspect of the invention.

FIG. 22 is a detailed perspective view of an unrolled fire spike assembly kit 150 having an assembled fire spike assembly 154 according to an aspect of the invention and fire hose 156.

Storage or carrying case 152 may be fabricated from any conventional material, for example, canvas or woven polyester or fiberglass.

As disclosed herein, aspects of the invention include fire spike assemblies, fire spike tips, methods of suppressing fire and flame, and kits for storing and transporting the assemblies and tips disclosed herein. It is envisioned that the assemblies, devices, and methods of the present invention may also be used to minimize, suppress, or eliminate fire and other hazardous situations where enhanced fluid distribution, including liquid or gas distribution, can be of benefit.

While various embodiments have been described above, it should be understood that these embodiments and their many aspects have been presented by way of example, and not limitation. It will be apparent to persons skilled in the relevant art that various changes in form and detail can be made therein without departing from the spirit and scope of the invention. Moreover, it is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The detailed description presented herein, therefore, is not to be taken in a limiting sense, and the scope of the present invention is defined only by the appended claims, appropriately interpreted, along with the full range of equivalents to which the claims are entitled.

Although the term “at least one” may often be used in the specification, claims and drawings, the terms “a”, “an”, “the”, “said”, etc. also signify “at least one” or “the at least one” in the specification, claims and drawings.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

The invention claimed is:

1. A fire spike tip comprising:

a monolithic cylindrical body having a first end adapted to be received by a conduit, a longitudinal centerline, and a second end having an external surface converging to a central pointed projection on or about the longitudinal centerline adapted to penetrate a surface when the body is under a load;

an internal cavity in the monolithic cylindrical body having an open first end and a closed second end;

a plurality of first orifices in the monolithic cylindrical body in fluid communication with the internal cavity, each of the plurality of first orifices directed in a first substantially radial direction and having a longitudinal centerline substantially parallel with the longitudinal centerline of the monolithic cylindrical body; and a plurality of second orifices in the monolithic cylindrical body in fluid communication with the internal cavity, each of the plurality of second orifices directed in a second direction and having a longitudinal centerline substantially parallel with the longitudinal centerline of the monolithic cylindrical body, wherein each of the longitudinal centerlines of the plurality of second orifices comprises a circumferential offset, δ, from the longitudinal centerline of one of the plurality of the first orifices wherein fluid flow from each of the plurality of second orifices at least partially intersects with fluid flow from at least one of the plurality of first orifices, and wherein a periphery of each of the plurality of second orifices at least partially overlaps with a periphery of at least one of the plurality of first orifices in the circumferential direction.

2. The fire spike tip as recited in claim 1, wherein the offset, δ, ranges from 0.025 inches to 0.100 inches.

3. The fire spike tip as recited in claim 1, wherein the offset, δ, comprises a percentage of a dimension of one of the first plurality of orifices and the second plurality of orifices.

4. The fire spike tip as recited in claim 1, wherein the monolithic cylindrical body comprises a circular monolithic cylindrical body.

5. The fire spike tip as recited in claim 1, wherein the at least partial intersection of the second fluid flow out of each of the plurality of second orifices with the fluid flow out of the at least one of the plurality of first orifices results in a lower droplet size than without the intersection.

6. The fire spike tip as recited in claim 1, wherein the at least partial intersection of the second fluid flow out of each of the plurality of second orifices with the fluid flow out of the at least one of the plurality of first orifices results in a desired distribution parameter, N.

7. The fire spike tip as recited in claim 1, wherein the plurality of second orifices is oriented in a direction making an angle α with the longitudinal centerline of the monolithic cylindrical body.

8. The fire spike tip as recited in claim 7, wherein the angle α ranges from 30 degrees and 60 degrees.

9. The fire spike tip as recited in claim 1, wherein the plurality of second orifices is longitudinally displaced from the plurality of first orifices.

10. The fire spike tip as recited in claim 1, wherein the central pointed projection comprises a circular conical pointed projection.

11. The fire spike tip as recited in claim 1, wherein the central pointed projection comprises a polygonal conical pointed projection.

12. The fire spike tip as recited in claim 1, wherein the central pointed projection comprises an apex angle from 15 degrees to 45 degrees.

13. The fire spike tip as recited in claim 1, wherein each of the plurality of second orifices is positioned radially interior of the plurality of first orifices.

14. The fire spike tip as recited in claim 1, wherein the plurality of second orifices is positioned in a beveled, recessed, annular surface of the monolithic cylindrical body.

15. The fire spike tip as recited in claim 1, wherein each of the plurality of second orifices is positioned interior of the plurality of first orifices.

16. A fire spike assembly comprising:

an elongated conduit having a first end and a second end; and the fire spike tip recited in claim 1 mounted to the second end.

17. The fire spike assembly as recited in claim 16, wherein the assembly further comprises a striking head mounted to the first end of the elongated conduit.

18. The fire spike assembly as recited in claim 17, wherein the assembly further comprises a valve stem mounted to the striking head, the valve stem having an internal passage in fluid communication with an internal cavity of the elongated conduit.

19. The fire spike assembly as recited in claim 17, wherein the striking head comprises a polygonal cylindrical shape.

* * * * *